United States Patent [19]

Brunsting

[11] Patent Number: 5,556,540
[45] Date of Patent: Sep. 17, 1996

[54] MAGNETIC ASSEMBLY FOR A CLOSED PRESSURIZED FLOW PATH OF LUBRICATING OIL

[76] Inventor: William J. Brunsting, 2171 Eagleton La., Lake Havasu City, Ariz. 86403

[21] Appl. No.: 523,594

[22] Filed: Sep. 5, 1995

Related U.S. Application Data

[63] Continuation-in-part of Ser. No. 268,828, Jun. 30, 1994, abandoned.

[51] Int. Cl.⁶ .................................................. B01D 35/06
[52] U.S. Cl. ....................... 210/222; 210/223; 184/6.25
[58] Field of Search ..................................... 210/222, 223, 210/695; 209/223.2, 224; 335/303, 304, 306; 184/6.25

[56] References Cited

U.S. PATENT DOCUMENTS

| | | | |
|---|---|---|---|
| 3,402,820 | 9/1968 | Lohmann | 210/222 |
| 3,460,679 | 8/1969 | Llewellyn | 210/222 |
| 3,480,145 | 11/1969 | Gladden | 210/223 |
| 4,218,320 | 8/1980 | Liaw | 210/223 |
| 4,446,019 | 5/1984 | Robinson | 210/223 |
| 4,450,075 | 5/1984 | Krow | 210/223 |
| 4,498,987 | 2/1985 | Inaba | 210/222 |
| 4,585,553 | 4/1986 | Hikosaka et al. | 210/223 |
| 4,629,558 | 12/1986 | Garritty | 210/130 |
| 4,705,626 | 11/1987 | Morelli | 210/130 |
| 4,826,592 | 5/1989 | Taylor | 210/223 |
| 4,992,166 | 2/1991 | Lowsky et al. | 210/130 |
| 5,009,779 | 4/1991 | Hebert | 210/223 |
| 5,078,871 | 1/1992 | McCready | 210/222 |
| 5,089,129 | 2/1992 | Brigman | 210/223 |
| 5,186,827 | 2/1993 | Liberti et al. | 210/223 |
| 5,228,990 | 7/1993 | Chiang | 210/223 |
| 5,354,462 | 10/1994 | Perritt | 210/223 |

FOREIGN PATENT DOCUMENTS

| | | | |
|---|---|---|---|
| 753673 | 7/1969 | Belgium | 335/303 |
| 1777351 | 4/1959 | France | 210/223 |
| 2158571 | 6/1972 | Germany . | |

Primary Examiner—Matthew O. Savage
Attorney, Agent, or Firm—Jack C. Munro

[57] ABSTRACT

A magnetic assembly for removing metallic particles from a closed pressurized flow path of lubricating oil, such as is used in engines, comprised of a magnetic member positioned against a canister of a typical engine oil filter. A ferrous material flux amplifier band is positioned against the exterior surface of the magnetic member. Alternatively, the magnetic member can be mounted on the inside surface of the canister with the canister itself acting as a flux amplifier. The magnetic member is magnetized so that it has alternating regions of polarity on both its inside and outside surfaces. The flux amplifier band covers substantially the entire outer surface of the magnetic member with it functioning to increase the intensity of the magnetic field inside the canister generated from the magnetic member. The thickness of the flux amplifier must be greater than the thickness of the canister and preferably at least two times its thickness so as to contain and direct the magnetic flux. The magnetic member can be constructed of a plurality of separate magnets arranged in a side-by-side abutting manner, or could be formed from an integral sheet of material. The surface of the magnetic member that is in direct contact with the canister precisely conforms to the exterior configuration of the canister.

6 Claims, 3 Drawing Sheets

5,556,540

MAGNETIC ASSEMBLY FOR A CLOSED PRESSURIZED FLOW PATH OF LUBRICATING OIL

REFERENCE TO PRIOR APPLICATION

This application is a continuation-in-part of U.S. patent application Ser. No. 08/268,828, filed Jun. 30, 1994 entitled MAGNETIC FILTER ASSEMBLY, by the same inventor, now abandoned.

BACKGROUND OF THE INVENTION

1. Field of the Invention

The present invention generally relates to an assembly for removing submicron to micron sized ferrous particles from moving liquids and in particular, is concerned with a magnetic assembly locatable on an oil filter canister usable within a closed system of lubricating oil with the magnetic assembly attracting and holding ferrous particles entrained within the oil preventing circulation of these particles within the closed system and thereby the engine to which the closed system connects.

2. Description of the Prior Art

Most engines used in automobiles, trucks and boats include canister-shaped oil filters that filter the engine's lubricating oil, removing foreign matter therefrom. To eliminate the larger particles of foreign matter, the engine oil is typically forced through a porous material in the oil filter that allows the liquid oil to pass through, but does not allow the passage of the larger particles. In this manner, the larger particles of foreign matter can be removed from the engine's lubricating oil. However, because this separation technique relies upon filtration through a porous material, particles that are smaller than the openings in the porous material are normally not removed by the filter medium. One particularly harmful type of foreign matter in lubricating oil is the small metallic (also ferrous) particles which are created by the frictional contact between the moving metal parts of the engine. These metallic particle contaminants can damage important engine components as such circulate through the engine.

Small metallic particles often have a cross-sectional dimension smaller than the openings in the porous filter material. When not removed by the oil filter, these small metallic particles will freely circulate through the engine until they are finally removed when the oil is changed. Typically, the porous material used in oil filters consists of a fibrous material that has openings with an average diameter greater than 20 microns. Hence, metallic particles with a cross-sectional dimension of 20 microns or smaller are often not trapped by the filter. Some metallic particles are larger than 20 microns. These metallic particles have sharp edges. Movement of these large particles by the force of the flow of the oil will cause these particles to "slice" like a knife through the filter producing holes greater than 20 microns thereby decreasing the filtering effectiveness of the oil filter.

The micron and submicron sized metallic particles are a major cause of wear of the moving components of the engine. Specifically, as the oil is circulated throughout the engine to lubricate the various moving components, the metallic particles entrained in the oil are carried to the interface between the moving components. At these locations, the hardness of the metallic particles causes metal to bear against metal, and reliance is placed solely upon the oil to maintain a lubricating film. When these metallic particles are brought to these interfaces, damage to the adjoining surfaces is likely. This damage eventually results in a degradation of the close tolerances between the moving parts, causing a loss in operating engine efficiency and more frequent maintenance in the form of repair. By some estimates, these metallic particles are the cause of more than one-half of the wear in the engine.

One approach taken by the prior art to eliminate these particles has been to install a magnetized drain plug in the crankcase of the engine. The magnetized drain plug generates a magnetic field around the magnet within the crankcase, which in turn attracts and removes some of the metallic particles from the lubricating oil as it flows through the crankcase. However, when the engine is running, the flow of oil through the crankcase can be at such a high flow rate so as to carry the metallic particles entirely through the magnetic field produced by the magnetized drain plug. In other cases, the magnetic field itself is insufficiently strong or extensive to attract and remove a meaningful number of particles from the lubricating oil.

Another prior approach to solve this problem has been to attach a magnet to the oil filter canister intending to create a magnetic field within the filter to attract and hold the ferrous particles against the walls of the filter. Unfortunately, these prior art attempts did not generate a sufficiently strong magnetic field to attract and hold any significant number of the metallic particles in the oil. The metallic particles contained in the oil, even if such pass through the magnetic field, are not likely to be attracted and held and thus continue to circulate through the engine.

A magnetic belt assembly for oil filters is disclosed in U.S. Pat. No. 3,460,679. This patent teaches securing the outside surface of permanent magnets to the inner surface of an annular spring steel belt. The belt is placed around an oil filter cartridge with the inner surfaces of the magnets engaging the outer surface of the cartridge. A magnetic field is supposed to be created by the magnets through the cartridge wall to attract metallic particles from the oil therein. The magnets are elongated and aligned axially on the cartridge. The magnets are spaced relative to each other on the spring steel belt which is more narrow than the elongated axial dimension of the magnets. As a result, only the middle region of the back surface of the magnets is covered by the narrow belt.

One significant problem associated with the device disclosed in U.S. Pat. No. 3,460,679 is the inability to generate a sufficiently strong magnetic field within the filter cartridge. The intensity of the magnetic field generated by the magnets is greater on the outside of the cartridge than on the inside thereof due to the influence of the ferrometallic cylindrical outer wall of the cartridge. The present inventor actually constructed a device according to U.S. Pat. No. 3,460,679 and used a gauss meter to measure the amount of magnetic force that was produced. The magnets that were used were bonded to iron having approximately a 5 MG maximum energy product. The band utilized was constructed of spring steel of a thickness of 0.032 of an inch with a width of 0.375 of an inch. There were ten magnets used that were located circumferentially around the filter canister about two inches from the top surface of the canister. The annular spring steel belt was centered over the middle of the magnets thus about 37.5% of the back of the magnets was covered by the annular spring steel belt. The magnets were separated from each other by 1.25 inch from edge to edge in a circumferential direction. The gauss readings on the back of the annular spring steel belt were 836 gauss, on the back of the exposed magnets was 1526 gauss, with the reading inside the canister being only 98 gauss. It can thus be seen that compared to the total magnet field strength of the magnets only about 7% of the total magnetic is field intensity supplied to within the canister. Therefore, most of the metallic particles suspended in the oil flowing within the cartridge are not retained within the cartridge by the relatively weak magnetic field therein.

Reference is to be had to U.S. Pat. No. 3,402,820, Lohmann, in which there Was disclosed a magnetic cleaner for a coolant. The coolant is to be moved through an elongated conduit and on the exterior wall of the conduit is mounted a magnetic arrangement. The magnetic arrangement comprises a plurality of different magnets which are separated by spacers. The magnets and the spacers are retained in place on the conduit by means of a clamping arrangement on the exterior surface of the magnetic arrangement. This structure of Lohmann was never designed to be utilized within a pressurized environment where the structure of the present invention is intended to be used. In most instances the mounting of an oil filter within an engine is in a very restricted area with very little space being left between the oil filter and the engine block or other associated parts of the engine. In other words, space is minimal. The structure of Lohmann is of such a great size that it would be incapable of being used in conjunction with an oil filter mounted on an engine. Additionally the spacing of the magnets within Lohmann substantially decreases the magnetic field within the elongated conduit. The present inventor constructed the device of Lohmann and again made gauss readings on the device. Magnets used were the same as those used in the discussion in the reference of U.S. Pat. No. 3,460,679. Because of the spacing of the magnets within Lohmann, the magnetic field recorded only 0.63 kG within the canister. If the magnets were placed in a flush abutting relationship as is the case within the present invention, the reading would increase within the canister to 1.69 kG.

Consequently, a need exists for an improved device for removing micron and submicron sized ferrometallic particles from the lubricating oil flowing through an engine. To this end, there is a need for an inexpensive device that can generate a stronger magnetic field than any of the devices known heretofore in the art. One embodiment of this device should be mountable on the outside of an oil filter and adaptable for use on different sizes of oil filters. This device should also be readily removable and reusable on different oil filters. Further, this device should be mounted on an oil filter in such a manner that minimizes the opportunity for the device to become detached from the oil filter.

SUMMARY OF THE INVENTION

The aforementioned needs are addressed by the present invention, comprised of an assembly for generating a strong magnetic field with a depth of field characteristic that allows the magnetic field to penetrate radially inward into an oil filter canister with sufficient field strength to attract and retain micron and submicron sized metallic particles. This assembly includes a magnetic member positioned either around the outside of an oil filter canister or mounted on the inside surface of the canister. The magnetic member is magnetized so that it has a plurality of spaced surfaces each of which has regions of alternating polarity. A flux amplifier is positioned on the outer surface of the magnetic member for amplifying the strength of the magnetic field within the oil filter canister.

During engine operation, lubricating oil is circulated through the oil filter canister and then through the engine. As the oil passes through the filter canister, the magnetic field generated by the magnetic member attracts the submicron and micron sized ferrous metallic particles from the oil and holds such against the interior surface of the outer wall of the canister of the oil filter, thereby preventing these particles from recirculating through the engine.

The intensity of the field generated in the oil filter canister and the depth of the field, i.e. the distance the field extends outward from the magnetic member with sufficient intensity to attract the particles from the lubricating oil, is dependent largely in part upon the influence of the flux amplifier. The device of this invention is capable of attracting and holding the submicron and micron sized metallic particles against the interior surface of the outer wall of the canister. The device is located at the area of inlet of oil to the filter so as to capture the particles before such enter the filter element.

It is important that the flux amplifier be constructed of ferrous material of high magnetic permeability, that it completely cover the exterior surface of the magnetizable member. If the flux amplifier does not cover the entire exterior surface of the magnetizable member, wherever it does not cover, magnetic flux will not be contained and directed toward the filter. The purpose of the flux amplifier is that, if gauss measurements were to be made with a gauss meter, that a significantly low reading would be obtained on the back surface of the flux amplifier band with a significantly higher reading being obtained from the surface of the magnetizable member that is to be placed in contact with the oil filter canister. It has been found that in order to obtain this desirable gauss reading arrangement, the thickness of the flux amplifier should be at least two times the thickness of the oil filter canister with 3–4 times being found to be most satisfactory to contain and direct the magnetic flux generated from the back surface of the magnetic member.

The magnetic member can be constructed in different manners. One manner would be to use a plurality of different magnets with these magnets being located in a side-by-side abutting arrangement. It is important that the sidewalls of these magnets actually physically contact each other or else flux will be lost. It is also further important that the sidewalls of these separate magnets contact one another in a flush manner eliminating any air gap therebetween. Air gaps cause energy loss. Another way that the magnetic member could be constructed is from a single sheet of material with a plurality of magnetic poles being formed within that single sheet of material, these magnet poles being of alternating polarity. Construction of magnets from a single sheet of material are known within the prior art with one particular manufacturer being Magnetic Specialty, Inc. located in Marietta, Ohio. It is also important that the magnetic member be in flush direct contact with the canister, again forming no air gap between the canister and the magnetic member, which would result in a decrease of the magnetic flux within the canister.

DETAIL DESCRIPTION OF THE PREFERRED EMBODIMENTS

Figure 1:
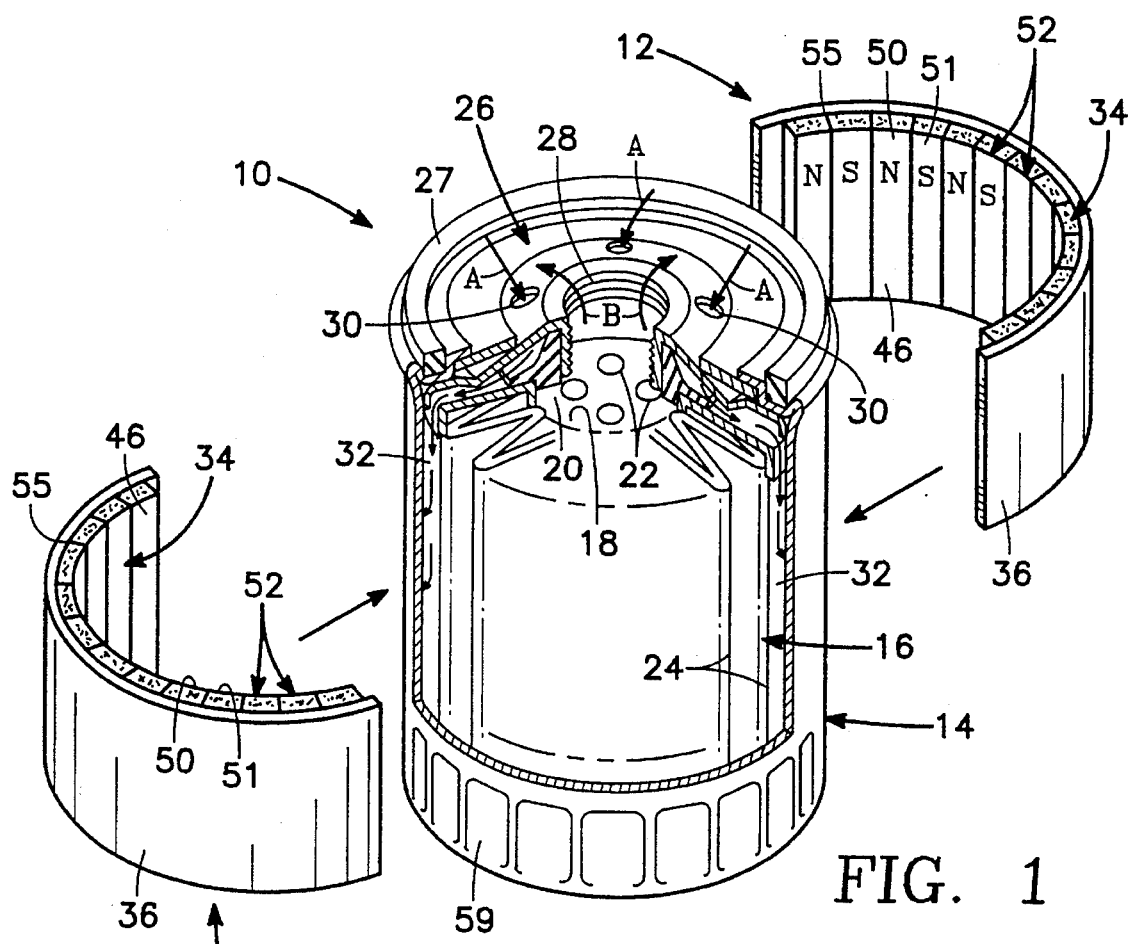
FIG. 1 is an exploded perspective view of a pair of magnetic members and flux amplifier bands according to this invention for use on a typical oil filter canister shown partially sectioned.
Figure 2:
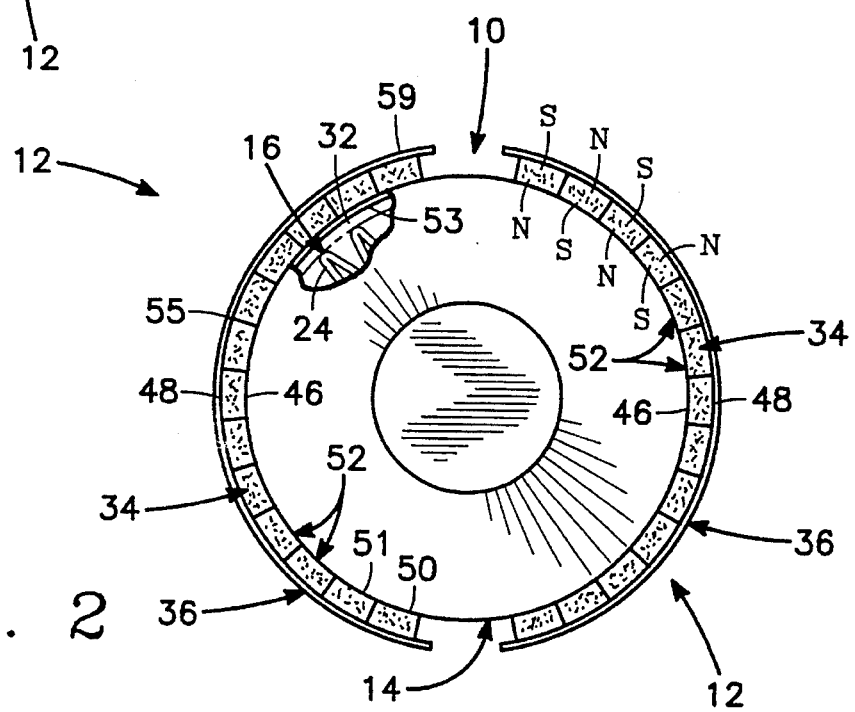
FIG. 2 is a bottom plan view of the magnetic members and flux amplifier bands applied to the oil filter canister.

The basic configuration of one preferred embodiment of the present invention will initially be described in reference to FIGS. 1 and 2. The advantageous operation of the preferred embodiment of the present invention shown in FIGS. 1 and 2 will then be described in reference to FIGS. 5 and 6. A second embodiment of this invention, shown in FIG. 3, will be described with reference to FIG. 4.

FIGS. 1 and 2 illustrate the components of a typical oil filter 10 such as a Type PF35 Duraguard Oil Filter manufactured by AC-Delco, General Motors Corporation, used on automotive engines, and the components of a preferred embodiment of a magnetic filter assembly 12 of the present invention. Although the invention is shown and described with reference to a cylindrically shaped oil filter canister, it can be readily used on non-cylindrical shapes as well.

The oil filter 10 includes a cylindrical, closed-ended canister 14 that is typically made of a ferrous material, such as steel. The canister wall thickness is typically 0.014 to 0.018 inches thick for thin wall canisters and 0.028 to 0.032 inches thick for thicker wall canisters having higher gallons per minute flow rate therein. A filter element 16 is contained within the canister 14 and is generally cylindrical in shape and accordion-folded. The interior of the canister includes a hollow center core 18 with a center shaft liner 20 having a plurality of circular holes 22 formed therein. A plurality of filter element vanes 24 are positioned entirely around, and radially outward an equal distance from, the center core 18. Typically, the filter element vanes 24 are made of a porous, fibrous material that allows the oil to pass through but traps larger foreign particles.

A circular plate 26, generally made of steel, is flushly mounted to a top end of the cylindrical canister 14. The circular plate 26 includes a rubber seal 27 and a circular threaded opening 28 positioned in the center of the plate 26. The threaded opening 28 provides access to the hollow center core 18 inside of the filter element 16. The circular plate 26 also includes a number of circular openings 30 positioned radially outward from the threaded opening 28 and circumferentially spaced an equal distance from each other.

The oil filter 10 is generally threaded onto a suitable filter mount (not shown) located on the engine (not shown) in conventional fashion so that the engine's lubricating oil enters the filter 10 through the openings 30 as shown by arrows A in FIG. 1 to fill a region or volume 32 between the interior wall of the canister 14 and the vanes 24 on the filter element 16. The porous nature of the material forming the vanes 24 permits the oil to flow through to the center core 18, while preventing the larger particles of foreign matter entrained in the oil from entering the center core 18. The oil entering the center core 18 is then recirculated back into the engine as indicated by arrows B through the threaded opening 28 to provide lubrication to the engine. Thus, the structure and the operation of the oil filter 10 is typical of most disposable canister type oil filters used in conjunction with automobiles, trucks, boats and large generator engines.

The magnetic filter assembly 12 includes a magnetic member 34 which may be constructed of any magnetic material possessing sufficient magnetic strength, resistance to the longterm effects of heat, oxidation and oil/fluid and sufficient physical strength. The magnetic material is preferably neodymium iron boron in one presently preferred embodiment. Preferably, the magnetic member 34 has a radial thickness of about 0.125 inches and an axial length of about 2.0 inches.

The assembly 12 is preferably positioned somewhat away from the steel plate 26, so that the steel plate 26 has a minimal effect on the magnetic field generated by the flexible magnetic member 34. In the preferred embodiment of FIGS. 1 and 2, the magnetic member 34 is preferably positioned about one-half inch from plate 26.

An arcuate shaped flux amplifier band 36 is positioned around the magnetic member 34. The flux amplifier band 36 is preferably made out of a high permeability steel, such as any commonly available, low carbon, cold rolled steel. Additionally, the flux amplifier band 36 is preferably dimensioned so that it covers completely all of the outer surface of the magnetic member 34. Further, the flux amplifier band 36 should be thick enough, and thereby have sufficient mass, to substantially carry the magnetic flux generated by the magnetic member 34, yet should also be sufficiently thin to avoid adding unnecessary weight to the assembly. The flux amplifier band 36 provides an effective, low-reluctance path for proper retention and redirection of the flux emanating from the magnetic member 34.

In the presently preferred embodiment shown in FIGS. 1 and 2, the flux amplifier band 36 is comprised of a low carbon cold rolled steel having a radial thickness of about 0.040 inches. This thickness of band 36 is to be used with canisters of thicknesses between 0.014 inches and 0.018 inches. Note that the band 36 thickness is between 2 and 3 times the thickness of the canister. For applications in which the wall thickness of the canister 14 is greater than about 0.018 inches, a thicker flux amplifier band is preferred. For example, a flux band of 0.08 inch thickness is preferred for thick walled filter canisters having a flow rate of over thirty gallons per minute. Preferably, the radially outer surface and all other exposed surfaces of the flux amplifier band 36 are painted or otherwise coated with a suitable rust and oxidation inhibiting coating.

The magnets 52 normally are quite brittle and therefore readily susceptible to breakage. If the magnet member 34 is dropped, breakage is common. If the magnets 52 break, it is important to keep the broken parts of the magnets 52 together into a single unit to avoid producing multiple north/south poles within each magnet 52. Therefore, the inner surface 46 of the magnet member 34 will normally be covered by a stainless steel (non-magnetic) thin cover (not shown) in a close fitting manner. This cover would have a perpendicular peripheral side flange (not shown) with the magnet member 34 being tightly laterally confined by the side flange. If the breakage occurs, no movement of the broken pieces occurs thereby still having the magnets 52 function in their normal manner.

The magnetic member 34 and the flux amplifier band 36 are positioned around the outer surface of the canister 14 and remain in that position solely by the magnetic force. No clamping straps are required. However, if the canister 14 was made of a nonferrous material, some securing means would be necessary. At the present time, a ferrous material for the canister 14 is less in cost than any suitable nonferrous material.

The magnetic member 34 has an inner surface 46 and an outer surface 48 of which the inner surface 46 is in intimate contact with the canister 14 and the outer surface 48 is in intimate contact with the flux amplifier band 36. Both surfaces 46 and 48 include axially extending regions of alternating polarity 50, 51 as shown in FIGS. 1 and 2.

In the preferred embodiment of FIGS. 1 and 2, the magnetic member 34 consists of multiple independent magnets 52 having opposite poles on each face and secured to the flux amplifier band 36 such that every other magnet 52 is reversed to thereby produce a magnetic member 34 having alternating regions of polarity 50, 51 on the inner and outer surfaces 46 and 48 thereof. Each magnet 52 is approximately two inches in length, 0.375 inches in width and 0.125 inches thick. When applied to the canister 14, the magnetic member 34 attracts and retains ferrous-metallic particles 53 on the inside surface of the canister 14 (FIG. 2).

It is to be noted that the independent magnets 52 could be constructed to not have perpendicular sidewalls 55. These sidewalls 55 have to be tapered so that they will abut flush with the juxtaposed independent magnet 52. The reason for this is that the path of the magnet member 34 is arcuate in order to flushly fit against the cylindrical surface of the canister 14. It is important that there not be any air gap between directly adjacent magnets 52 nor that there is any gap between the magnets 52 and the canister 14. Any air gap in these areas will result in a substantial loss of effectiveness of the conducting of the magnetic field within the internal chamber of the canister 14.

The inner surface 46 of the magnetic member 34 is preferably coated with a release agent to prevent the magnetic member 34 from bonding to the paint on the canister 14 as a result of the prolonged contact with the canister 14 under elevated operating temperatures. Elastic polymers used in magnets often tend to bond to other organic surfaces such as coatings or paints when subjected to a combination of heat, pressure and time. Since the binder for the magnetic member 34 according to this invention is preferably elastomeric and the ease of release from the canister 14 is important for reuse of the assembly 12, a coating is preferably applied to the magnetic contact surface 46. Furthermore, the neodymium iron boron magnetic component is susceptible to the effects of exposure to water and road salts. Therefore, a protective coating is also preferably applied thereto. A polyurethane enamel available from Sherwin Williams® identified as Polane® T is a suitable protective coating for the magnetic members 34.

As shown in FIGS. 1 and 2, multiple magnetic filter assemblies 12 are preferably used on a single oil filter 10 to provide coverage around substantially the entire circumference of the canister 14. The magnetic assemblies 12 are preferably positioned proximate the top end of the canister 14 so that the magnetic field generated attracts the ferrous metallic particles 53 as they enter the canister 14 through the holes 30 in the steel plate 26.

Furthermore, the axial length of the magnetic filter assemblies 12 should preferably cover at least one-third of the axial length of the canister 14. Multiple assemblies 12 can be positioned both axially and circumferentially on the canister 14 to provide the preferred coverage for larger sized filter canisters.

Figure 5:
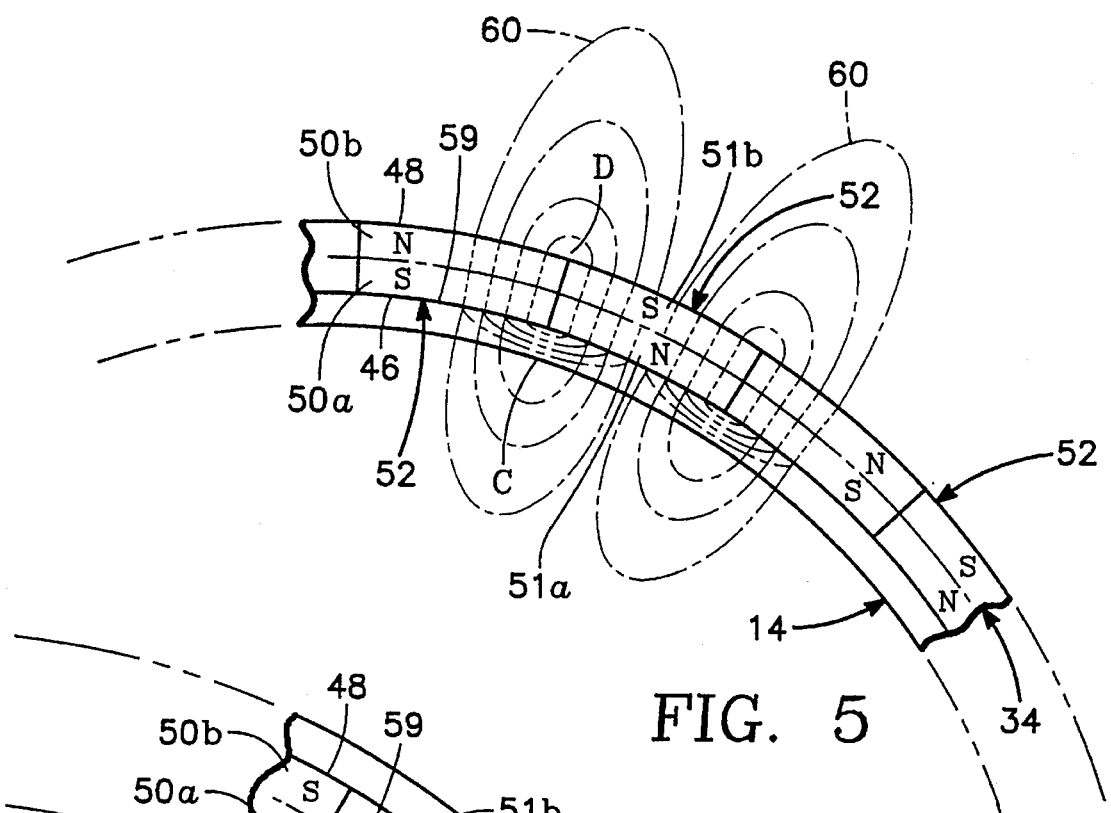
FIG. 5 is a diagrammatic view of the magnetic field generated by the magnetic members of the first embodiment of this invention applied to the outside of the canister without the flux amplifier band.
Figure 6:
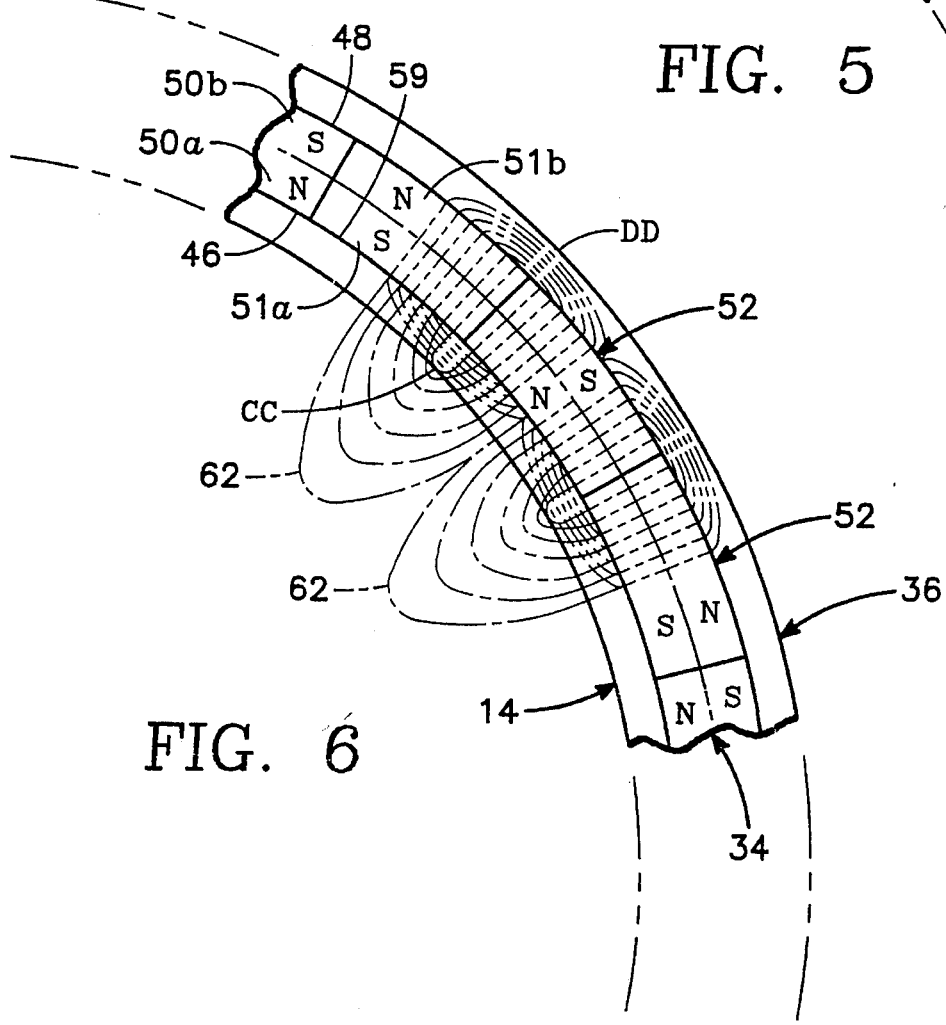
FIG. 6 is a diagrammatic view with the magnetic field generated by the magnetic members of the first embodiment of this invention applied to the outside surface of the canister with the flux amplifier band.

Referring now to FIGS. 5 and 6, the effect of the flux amplifier band 36 on the magnetic field produced by the magnetic member 34 inside the oil filter 10 will now be described. FIGS. 5 and 6 illustrate a typical cross-section of the magnetic member 34 as shown in the preferred embodiment shown in FIGS. 1 and 2. As discussed previously, the magnetic member 34 is divided into multiple magnetic regions 50 and 51.

FIG. 5 shows a magnetic field 60 generated by the magnetic member 34 in the first preferred embodiment without the flux amplifier band 36. In the absence of the flux amplifier band 36, the magnetic field generated by the first region of polarity 50a of the magnetic member 34 passes radially inward into the canister 14 of the oil filter 10 to pass laterally to the adjacent opposite polarity region 51a of the magnetic member 34. The magnetic flux 60 then passes from the inner surface 46 of the magnetic member 34 through the magnetic member 34 to the oppositely polarized region 51b on the outer surface 48 of the magnetic member 34 to generate a field thereabout. The flux then produces the magnetic field 60 outside of the magnetic member returns 34 back to the oppositely polarized adjacent region 50b on the outer surface 48 of the magnetic member 34 through to the inner surface 46 oppositely polarized region 50a to complete the flux path. adjacent, oppositely polarized magnetic regions 50 and 51 in the magnetic member 34 of this invention. The exterior wall 58 of the canister 14 is typically made of a ferrous material which provides a permeable path for a portion of the magnetic flux generated by the magnetic member 34 in that the permeance of the canister 14 is much higher than the non-magnetic volume within the canister 14. Consequently, the canister 14 decreases the intensity of the magnetic field within the region 32 where the oil circulates in the filter 10. The effectiveness of the magnetic member 34 in the absence of the flux amplifier band 36, as shown in FIG. 5, to attract small metallic particles within the circulating oil is severely reduced. Actually, the canister 14 itself acts as a flux amplifier to focus the magnetic field outwardly from the canister 14 as shown in FIG. 5. In contrast, with the flux amplifier band 36, as is shown in FIG. 6, positioned in intimate contact and covering substantially all of the outer surface 48 of the magnetic member 34, the reduction in the intensity of the magnetic field in the region 32 of the oil filter 10 is largely overcome. The flux amplifier band 36 provides a more efficient, low reluctance path for the magnetic flux to travel. The materials and dimensions of the flux amplifier band are preferably selected to increase the amount of flux within the region 32 in the canister 14 by oversaturating the canister 14.

Specifically, with the flux amplifier band 36, as shown in FIG. 6, the magnetic flux passes 62 from the region 50a on the inner surface 46 of the magnetic member 34 through the canister wall and into the region 32. The magnetic flux then passes through the region 62 and back through the canister wall to the adjacent oppositely polarized region 51a on the inner surface 46 of the magnetic member 34. The flux then passes from the inner surface 46 through the magnetic member 34 to the oppositely polarized region 51b on the outer surface 48 of the magnetic member 34 and then into the flux amplifier band 36. The flux amplifier band 36 provides a path of least resistance for the magnetic flux so that when the flux travels through the amplifier band 36, an efficient contained path along the exterior surface 48 of the magnetic member 34 is provided. The flux then travels from the band 36 to the adjacent oppositely polarized region 50b on the outer surface 48 of the magnetic member 34 and then passes through the member to the oppositely polarized region 50a on the inner surface 46 of the magnetic member 34 to complete the magnetic field.

Specifically, the magnetic field 60 at the inside surface of the canister 14 at a location identified by C in FIG. 5 without the effect of the flux amplifier band 36 was measured at 155 gauss, whereas a corresponding location identified by CC on FIG. 6 with the flux amplifier band 36 was measured at 1,400 gauss. On the exterior surface 48 at a location indicated by D in FIG. 5 without the flux amplifier band 36, the magnetic field intensity 60 was measured at 1,750 gauss, whereas at a corresponding location with the flux amplifier band 36 as shown by DD in FIG. 6, the magnetic field strength 62 was measured at approximately 60 gauss. A 5 MG.Oe magnet with a 0.08" thick steel flux amplifier band was used for the generation of the magnetic field strength data. Therefore, based on a comparison between corresponding locations in magnetic fields generated by the same strength magnetic member, the magnetic field generated by the assembly 12 with the flux amplifier band 36 is significantly greater within the canister 14 and the region 32. The flux amplifier band 36 overcomes the effect of the canister 14 itself to direct the magnetic field outward, thereby generating a significantly stronger magnetic field 62 within the canister 14 where the oil circulates.

Therefore, the flux amplifier band 36, according to this invention, significantly focuses inwardly the magnetic field generated by the magnetic member 34 to provide a sufficiently strong field in the region 32 within the filter 10 to attract essentially all of the ferrous particles 53 within the region 32 and hold such against the interior surface of the canister 14. FIGS. 5 and 6 schematically illustrate the resulting flux lines and magnetic field intensity both inside and outside of the canister 14 with and without the flux amplifier band 36, respectively. As clearly shown in FIG. 5 without the flux amplifier band 36, a large amount of magnetic flux extends radially outward from the magnetic member 34 which in turn results in less magnetic flux inside the filter 10 where the oil circulates. In contrast, with the flux amplifier band 36 positioned to cover the outer surface 48 of the magnetic member 34 as shown in FIG. 6, the amount of flux dissipated away from the filter 10 is greatly reduced and, correspondingly, the amount of magnetic flux and the intensity of the magnetic field 62 inside the oil filter 10 is considerably increased. Hence, by including the flux amplifier band 36 to limit the flux that escapes outside the canister 14, the desirable effect of increasing the intensity of the magnetic field in the region 32 where the oil circulates is obtained.

Figure 3:
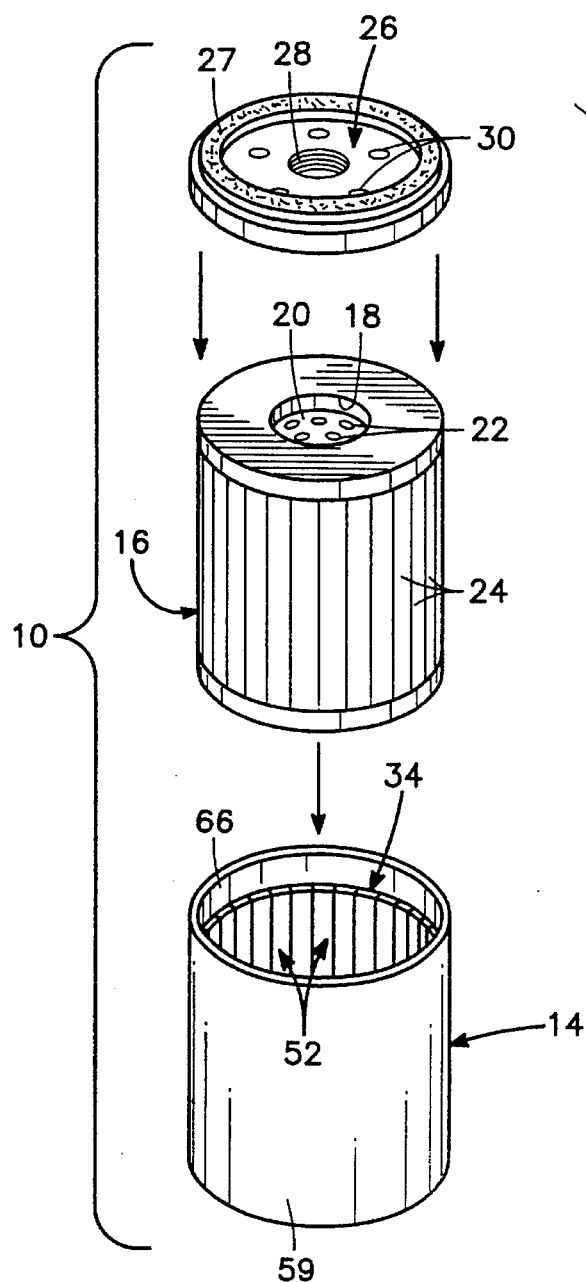
FIG. 3 is an exploded view of an oil filter canister having magnetic members in a second embodiment of this invention applied to the inside surface of the canister.
Figure 4:
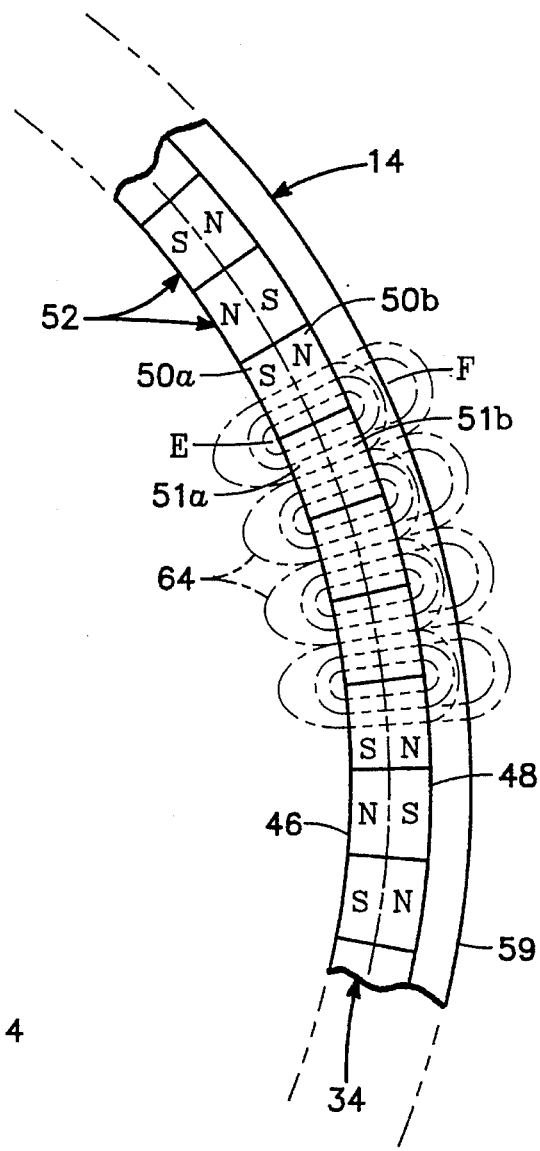
FIG. 4 is a diagrammatic view of the magnetic field generated by the embodiment shown in FIG. 3.

The second preferred embodiment according to this invention is shown in FIG. 3 with a magnetic field 64 generated thereby schematically shown in FIG. 4. In this embodiment, the magnetic member 34 is mounted on an internal surface 66 of the canister 14 and has axially extending alternating regions of polarity 50 and 51 on both faces 46 and 48 similar to the first embodiment shown in FIGS. 1 and 2. Once the magnetic member 36 is secured to the inside surface 66 of the canister 14, the filter element 16 and the top steel plate 26 are secured to the canister 14 in the manufacture of a filter 10 which includes the magnetic member 34 according to this invention. As a result, the magnetic member 34 is positioned within the region 32 where the oil circulates in the filter 10 so as to attract the ferrous metallic particles 53 directly to the magnetic member 34 itself. Since the magnetic member 34 is mounted within the filter 10, ferrite magnets of either a ceramic or bonded type should be used. The polymer bonded type of magnet would require a binder matrix of either heat and oil resistant elastomers (i.e. polyacrylate, high temperature varieties of acrylonitrile butadiene) or plastic resin (i.e. polyphenylene sulfide or phenolic). A ferrite magnetic member having an energy product of at least 1.4 MG.Oe is preferably used in this second embodiment.

The magnetic member 34 also must have a low-dimensional profile to conform to the curvature of the canister wall and not interfere with the operation of the filter element 16 nor significantly alter the flow of the oil within the region 32 between the canister 14 and the filter element 16. Specifically, the filter element 16 in many commercially available filters 10 is spring loaded axially within the canister 14 so that if the filter 10 becomes clogged, the filter element 16 is forced upwardly toward the steel plate 26 to thereby continue the flow of the oil by bypassing the oil directly from the inlet to the outlet. The magnetic member 34 mounted within the canister 14 should not interfere with the operation of the filter element 16 as described.

In this second preferred embodiment, the canister 14 serves both as the canister itself and the flux amplifier for the magnetic member 34 mounted therein. Furthermore, the mild steel construction of the canister 14 in most oil filters 10 enables the canister 14 to act as a high permeability flux amplifier. The strength of the magnetic member in the second embodiment does not need to be as great as the magnetic member in the first embodiment in that it is mounted within the region 32 and is in direct contact with the circulating fluid and does not have to overcome the short-circuit effect of the canister 14 in order to generate a magnetic field within the region 32. In similarity to the first preferred embodiment, the entire outer surface 48 of the magnetic member 34 is covered by and preferably in intimate contact with the flux amplifying/canister 14 and the magnetic member 34 extends substantially completely around the circumference of the filter 10 and covers at least one-third the axial length thereof.

The magnetic member 34 shown in FIG. 3 is mounted within the canister 14 and is approximately 0.06 inches thick. The magnetic field strength produced is about 700 gauss at the point indicated by E in FIG. 5 within the region 32 of the circulating oil. The filter canister 14 was steel and about 0.018 inches thick. A gauss reading of approximately 20 was measured on the exterior surface of the canister 14 at a location indicated by F in FIG. 5. Therefore, with the canister 14 functioning as the flux amplifier focusing and intensifying the magnetic field 64 within the region 32, a sufficiently strong magnetic field 64 is generated to attract the ferrous magnetic particles for retention in the filter 10.

Both of the devices described herein generate a magnetic field within the oil filter body which, extend the field radially inward inside the canister 14 and generate magnetic field strengths which allow substantially all of the micron and submicron sized ferrous particles in the filter to be attracted and held against the interior wall of the canister 14.

Specifically, the foregoing description of the preferred embodiments of the present invention has been limited to a description of using the magnetic filter assembly in conjunction with a type of oil filter that is primarily used in automotive engines. As a person skilled in the art can readily appreciate, the present invention can be modified to be used with other types of filters and applications to remove entrained ferrous metallic particles from a circulating fluid in general. Consequently, the scope of the invention should not be limited to the foregoing description, but is to be defined by the appended claims and equivalents thereof.

What is claimed is:

1. In combination with a canister having a sheet material ferrous outer wall enclosing an internal chamber, said outer wall having an exterior surface and an interior surface, said interior surface forming the enclosing wall surface of said internal chamber, said outer wall having a first thickness, a liquid containing entrained ferrous particles to circulate through said internal chamber, a magnetic assembly for removing said entrained ferrous particles from said liquid, said magnetic assembly comprising:

a magnetic member having a magnetic force exerted from an internal surface thereof, said internal surface being mounted directly onto said exterior surface of said outer wall and securely retained against said outer wall solely by said magnetic force, said magnetic member generating a magnetic field within said internal chamber which attracts said ferrous particles and holds said ferrous particles against said interior surface of said outer wall preventing said ferrous particles from exiting said internal chamber, said magnetic member having a plurality of regions of alternating polarity where each said region is juxtaposed to a directly adjacent said region of alternate polarity not having any air gap between directly adjacent regions, said magnetic member having an external surface opposite said internal surface; and a flux amplifier member composed of ferrous sheet material having a second thickness, said flux amplifier member being mounted directly against said external surface of said magnetic member completely covering such, said flux amplifier member having sufficiently high permeance to direct said magnetic field proximate said magnetic member and substantially increase the strength of said magnetic field within said internal chamber when compared to using said magnetic member without said flux amplifier member, thereby more effectively attracting and holding said ferrous particles against said interior surface of said outer wall.

2. The combination as defined in claim 1 wherein:

said outer wall being arcuate, said magnetic member having an inner surface which is mounted directly onto said exterior surface of said canister, said inner surface being also arcuate and conforming to said exterior surface of said canister.

3. The combination as defined in claim 1 wherein:

said exterior surface of said outer wall of said canister having a circumference, said magnetic member being of a length shorter than said circumference of said canister thereby not completely encompassing said canister permitting said canister to expand and contract due to pressure and temperature.

4. The combination as defined in claim 1 wherein:

said magnetic member precisely conforming to the shape of said canister.

5. The combination as defined in claim 1 wherein:

said second thickness being at least two times said first thickness.

6. The combination as defined in claim 1 wherein:

said magnetic member being composed of a plurality of separate magnets, each said separate magnet having opposite sidewalls, each said sidewall of one said separate magnet being abutingly located to each said sidewall of another said separate magnet with said abutting location eliminating of any air gap therebetween.

* * * * *